United States Patent [19]

Scheidt et al.

[11] Patent Number: 4,958,058

[45] Date of Patent: Sep. 18, 1990

[54] TRANSVERSE FLOW LASER SPRAY NOZZLE

[75] Inventors: Wilbur D. Scheidt; Eric J. Whitney, both of Cincinnati; Vanon D. Pratt, Hamilton, all of Ohio

[73] Assignee: General Electric Company, Cincinnati, Ohio

[21] Appl. No.: 307,794

[22] Filed: Feb. 8, 1989

[51] Int. Cl.$^5$ .............................................. B23K 26/00
[52] U.S. Cl. ............................ 219/121.6; 219/121.63; 219/121.65; 219/121.84; 219/121.85
[58] Field of Search ........... 219/121.6, 121.85, 121.84, 219/121.65, 121.66, 121.63, 121.64; 118/620, 300; 239/79, 85; 427/53.1, 422

[56] References Cited

U.S. PATENT DOCUMENTS 4,200,669 4/1980 Schaefer et al. .................... 427/53.1

FOREIGN PATENT DOCUMENTS 0177166 8/1987 Japan .

Primary Examiner—C. L. Albritton
Attorney, Agent, or Firm—Jerome C. Squillaro; Carmen Santa Maria

[57] ABSTRACT

A feed material is melted by a focussed laser beam in a partially confined interaction volume, and ejected from the interaction volume in a direction different from the axis of the laser beam. The feed material, preferably in the form of a finely divided powder fluidized by a gas stream, is fed to the interaction volume in a direction transverse to the axis of the laser beam. Confinement of the molten feed material is preferably attained using balanced gas pressures that do not permit the molten feed material to flow in the direction parallel to the laser beam. The energy density of the laser beam is preferably sufficiently high to form a plasma within the interaction volume from gas and vaporized feed material atoms, so that the feed material is introduced into the plasma.

18 Claims, 2 Drawing Sheets

TRANSVERSE FLOW LASER SPRAY NOZZLE

BACKGROUND OF THE INVENTION

This invention relates to the vaporization and spraying of materials and, more particularly, to such spraying induced by laser heating.

In many modern materials systems, it is necessary to add layers of a material to an existing substrate. In some circumstances, a coating of a hard, wear resistant material is overlaid onto a strong, ductile material. The resulting composite provides a structural component that has good mechanical properties such as strength, ductility, and fracture toughness, and also has a surface that does not wear rapidly in environments that are erosive and/or corrosive. In another application, a part can be repaired by adding to the substrate new material of the same (or a different) composition as the substrate, gradually building up a thickness of the added material to replace that which may have been lost during service. Many other applications of coating are in widespread use, because of the versatility afforded in designing custom materials systems.

The layers of the material may be added to the substrate in many different ways, depending upon the substrate, the added material, and the performance required. The added material may be provided in a bulk form and laminated, bonded, or affixed to the substrate. Alternatively, the material to be added can be provided in a form different from its final configuration and applied to the substrate atomically, often in either the molten or vaporous state. In many instances, the latter type of approach is preferred to produce an excellent bond of the added material to the substrate and to produce a highly controllable final product.

In one widely practiced approach, a plasma is formed with an electric arc. Metal powder in a gas stream is directed through the plasma, causing the metal to melt and form metal droplets. The molten metal is then sprayed against a substrate to solidify as a coating or built-up layer. Plasma spraying and other similar techniques are not operable for some metals, such as, for example, titanium alloys sprayed in an atmospheric environment. Additionally, the geometry of the plasma spray apparatus is not suitable for applying the sprayed metal to some forms of substrates, such as the interior of bores.

Therefore, there is a need for a new approach to depositing materials on substrates, that permits deposition of the material into constricted or inaccessible locations. The present invention fulfills this need, and further provides related advantages.

SUMMARY OF THE INVENTION

The present invention is embodied in an apparatus for material spraying, which maintains the advantages of prior spray techniques and also allows great versatility in the selection of apparatus geometry to deposit material on otherwise inaccessible locations of a substrate. The substrate is not directly heated by the laser, permitting it to remain relatively cool.

In accordance with the invention, apparatus for producing a flow of a molten feed material comprises a laser heating source having a beam directed into an interaction volume, the beam having an intensity within the interaction volume sufficient to melt the feed material when introduced into the interaction volume; means for introducing the feed material into the interaction volume; and means for partially confining the molten feed material within the interaction volume and for ejecting the molten feed material from the interaction volume in a direction having a component transverse to the laser beam.

In another embodiment, apparatus for producing a flow of a molten feed material comprises containment means for confining a plasma within an interaction volume; a laser having a beam directed into the interaction volume along a laser beam direction, the laser having a beam energy density sufficient to form a plasma within the interaction volume and to melt the feed material when introduced into the interaction volume; means for introducing the feed material into the interaction volume; and means for ejecting melted feed material out of the interaction volume in a direction different from the laser beam direction.

In a preferred approach, the laser beam is focussed into the interaction volume by a mirror or lens with sufficient intensity to form a plasma. A gas-fluidized stream of the feed material is fed into the plasma from the side, so that the feed apparatus is not exposed to the laser beam. The plasma and melted feed material therein are confined to the limited interaction volume with a balanced gas pressure, preventing the plasma and molten feed material from expanding along the axis of the laser beam. An opening in the side of the container, oppositely disposed from the port where the feed stream is introduced, permits the molten feed material to escape in a direction perpendicular to the axis of the laser beam. The substrate is therefore not exposed directly to the laser beam, and the flow of feed material is deposited perpendicular to the laser beam axis. This configuration permits the construction of a long, probe-like deposition apparatus that can be used to deposit material inside bores or other relatively inaccessible locations. Because the substrate is not directly heated by the laser beam, its structure is normally not significantly altered during the deposition process.

More specifically, apparatus for producing a molten feed material comprises a container having a side wall and a laser beam energy dump at one end thereof; a laser whose beam is introduced into the container along a beam axis in the direction of the laser beam energy dump; a powder introduction port in the side wall of the container, whereby a powder of the feed material may be introduced into the interior of the container at an interaction volume located along the laser beam axis; a confinement gas source that produces substantially equal gas pressures within the container at locations equally and oppositely displaced along the laser beam axis from the interaction volume; and a metal spray port in the side wall of the container adjacent the interaction volume.

The present invention also extends to a process for spraying metal utilizing laser heating. In accordance with this aspect of the invention, a process for forming a flow of molten feed material comprises the steps of directing a laser beam into an interaction volume, the laser beam within the interaction volume having an energy density sufficient to melt feed material contained within the interaction volume; introducing the feed material into the interaction volume; and removing a stream of melted feed material from the interaction volume in a direction different from the direction of the laser beam.

The apparatus and process of the invention provide an important advance in the art of spray deposition of feed materials. Laser energy is used to melt a feed material in a highly efficient, controllable manner. The axis of the deposition is different from the axis of the laser beam, avoiding unnecessary heating of the substrate and permitting the construction of deposition apparatus for use in confined spaces. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
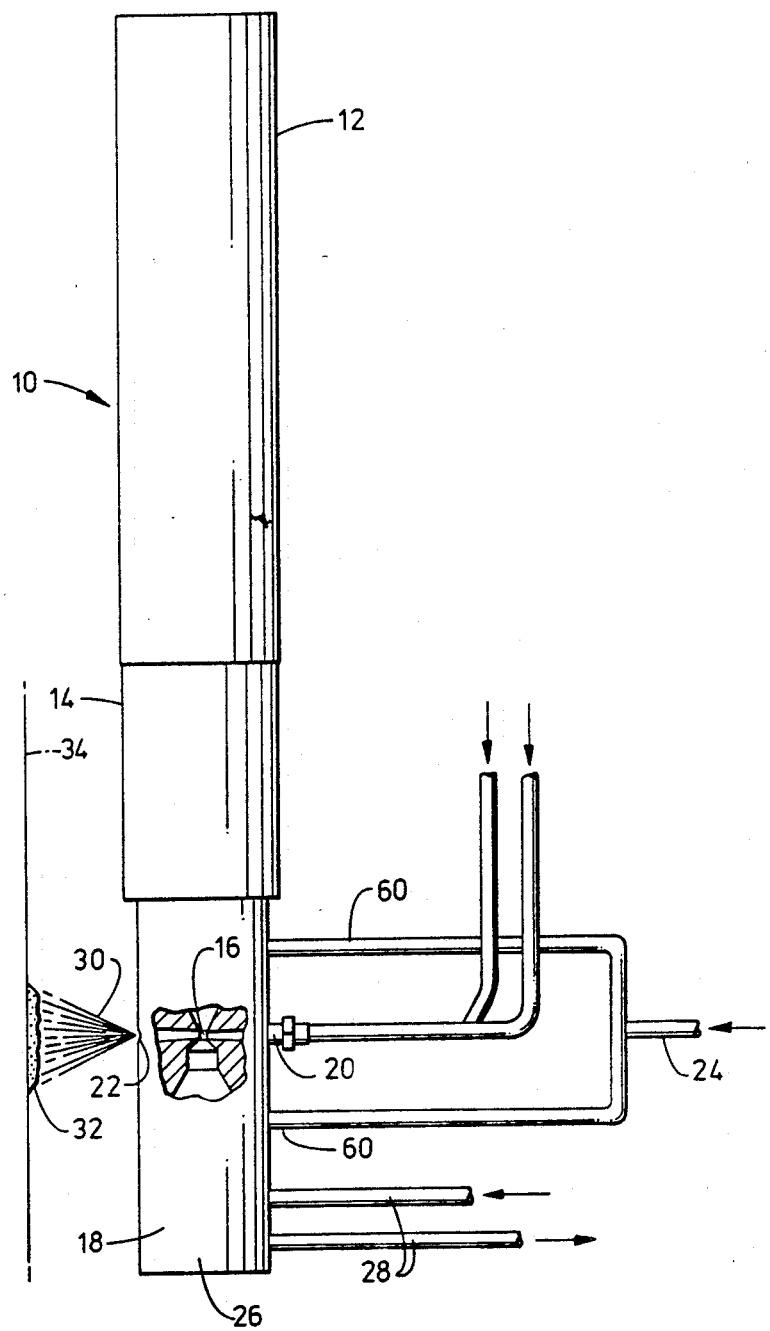
FIG. 1 is an schematic illustration of an apparatus in accordance with the invention.

The present invention is preferably embodied in a transverse flow laser spray apparatus 10, illustrated generally in FIG. 1. The apparatus 10 includes a laser 12 whose beam is directed through an optics section 14, which focuses the beam at a interaction volume 16 within a transverse flow nozzle 18. Preferably, the energy density of the laser beam at the interaction volume is sufficiently high to create a plasma. A flow of gas-fluidized powdered feed material is added to the interaction volume from a powder introduction port 20 in the cylindrical wall of the nozzle 18. In the interaction volume 16, the feed material is rapidly heated by the laser beam and melted.

The molten metal is partially confined within the interaction volume 16. That is, the molten metal is not permitted to flow along the axis of the laser beam, but is permitted to flow out a metal spray port 22 oppositely disposed in the wall of the nozzle 18 from the powder introduction port 20, under the acceleration and force imposed by the gas stream in which the powdered feed material had been fluidized. The partial confinement is accomplished with balanced gas pressure along the axis of the laser beam, introduced through a confinement gas system 24. Any excess energy of the laser beam, not absorbed by feed material as it is heated and the plasma, if present, impacts a laser beam dump 26, which is cooled by water flowing through cooling lines 28.

The flow of molten feed material flows transversely to the axis of the laser beam, out of the nozzle 18 as a spray 30. The spray 30 can then be utilized as required, typically by forming a deposit 32 on a substrate 34.

Figure 2:
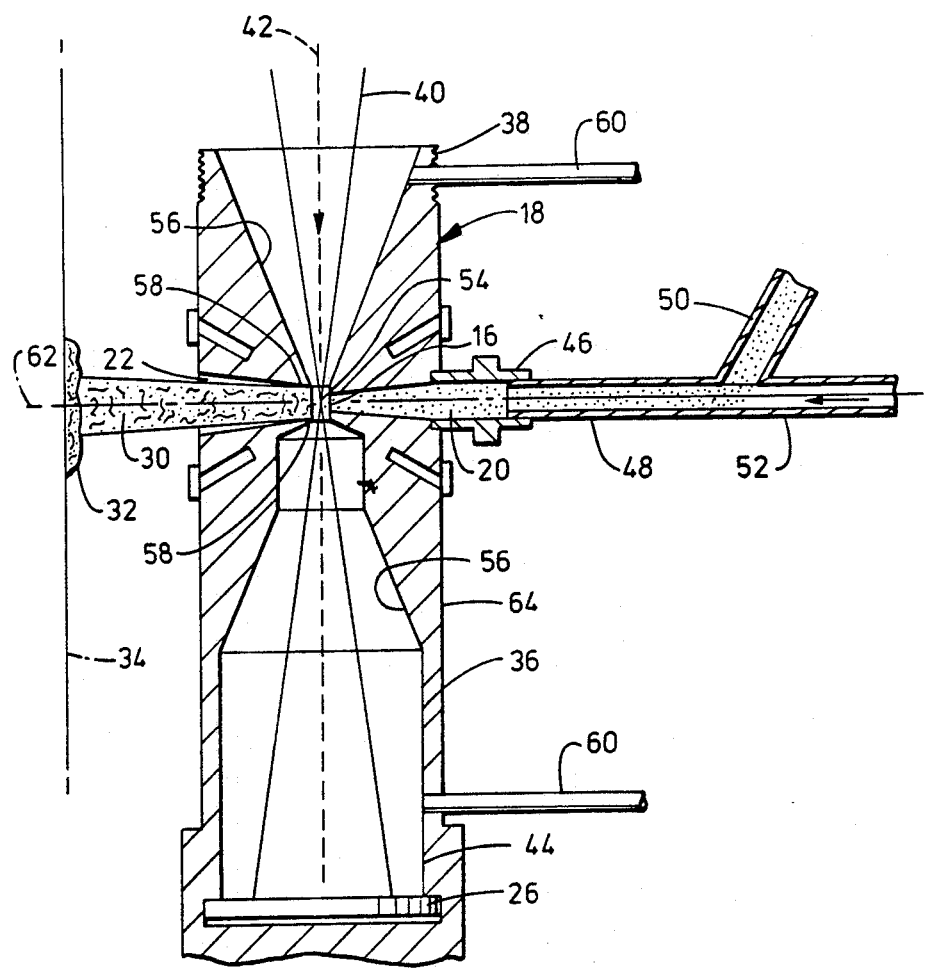
FIG. 2 is a sectional view of the transverse laser nozzle.

The transverse flow nozzle 18 is shown in greater detail in FIG. 2. The nozzle 18 includes a cylindrical housing container 36. A first end 38 of the container 36 is open, and is affixed to the optics section 14, so that a converging laser beam 40 may be introduced into the container 36 along its cylindrical axis 42. At the other or second end 44 of the container is a water cooled aluminum block that functions as the laser beam energy dump 26. The beam energy dump 26 absorbs and dissipates that portion of the energy of the laser beam 40 which passes through the interaction volume 16.

The powder introduction port 20 is located in the cylindrical sidewall 64 of the container 36. The port 20 includes a fitting 46 attached through the sidewall 44. The fitting 46 receives at its external end a fluidized powder delivery tube 48, through which powder of the feed material is introduced into the interior of the container 36. The fluidized stream is formed by introducing a flow of powder from a powder tube 50 into a flow of fluidizing gas in a fluidizing gas tube 52.

The stream of fluidized powder from the delivery tube 48 flows into the interior of the container 36, and into the path of the laser beam 40 at or near its focal point 54. The gas and powder are rapidly heated by the absorption of energy from the laser beam 40. While not wishing to be bound by this explanation, it is believed that powder molecules vaporize from the surface of the powder particles. The heating of the gas and the vaporized atoms of the feed material, if to a sufficiently high temperature, strips electrons from the molecules and forms a plasma. The plasma radiates heat, causing the powder particles of the feed material to melt. Even if a plasma does not form, the powder particles are melted. It is preferred that the plasma be formed, however, as the heating of the particles is more efficient and uniform. The independently radiating plasma also enlarges the volume of the interaction volume, and accelerates the material to be deposited toward the substrate.

The molten feed material in the interaction volume 16 is partially constrained in its ability to expand. As used herein, "partially constrained" means that the molten feed material is constrained against expansion or movement along the cylindrical axis 42. To accomplish the partial constraint of the molten feed material, a balanced gas pressure is established within the interior of the container 36 on either side of the axial position of the interaction volume 16. The applied gas pressure and flow of gas toward the interaction volume prevent the material within that volume from moving away from the interaction volume in a direction parallel to the cylindrical axis 42.

To form the partial constraint system, two conical containment nozzles 56 are fixed within the interior of the sidewall 44, with their conical axes coincident with the cylindrical axis 42. The apex openings 58 of the conical nozzles 56 are adjacent to, and point toward, the interaction volume 16. A gas pressure is established within the interior of each nozzle 56, so that there is a flow of gas toward the interaction volume 16, along the axis 42. The laser beam passes through the apex opening 58 of each nozzle 56 unimpeded and into the interaction volume 16, but molten feed material cannot readily diffuse outwardly along the axis 42 and away from the interaction volume 16 against the gas flow.

The gas pressure within the container 36, the two nozzles 56, is established by introducing gas flows through confinement gas lines 60, which are part of the confinement gas system 24. It is important that the gas flows through the apex openings 58 of the two containment nozzles 56, and the pressures of the gas therein, be approximately equal to each other, to avoid destabilizing the molten feed material and the plasma, if present. A sufficiently large gas flow and pressure differential between the two nozzles 56 can result in the molten metal and plasma being forced out of the interaction volume 16. In that instance, melting would become inefficient, and the apparatus 10 might be damaged.

The molten feed material and plasma cannot diffuse along the cylindrical axis 42 due to the gas containment, and cannot diffuse back toward the powder introduction port 20 because of the carrier gas flow. The molten feed material and plasma therefore expand and flow away from the port 20, and out the metal spray port 22 along an axis 62 which is not coincident with the cylindrical axis 42 and the laser beam 40. The port 22 is normally positioned sufficiently far from the substrate 34 that the plasma does not overheat the substrate 34. The molten feed material reaches the substrate 34 to form the deposit 32.

In one operating embodiment of the invention, the container 36 is a hollow brass cylinder having a length of about 6½ inches and a diameter of about 1.4 inches. The apex opening is about 0.070 inches in diameter. The gas flow rate in each of the lines 60 is about 5 cubic feet per hour, and the gas is argon. Other acceptable gases include nitrogen, helium, hydrogen, oxygen, carbon dioxide, and mixtures thereof. The preferred laser is a carbon dioxide laser having a power of greater than 3 kilowatts, operated in a multi-mode. Under these conditions, a plasma was formed in the interaction volume, which is then also a plasma formation volume.

The nickel alloy Inconel 718 was transversely sprayed using the preferred apparatus 10 by plasma spraying alloy particles of size −200 mesh. Using the apparatus just described, a flow rate of 10 grams per minute of alloy powder fluidized in 30 cubic feet per hour of argon gas was introduced through the powder introduction port 20. The powder was melted in the plasma, and deposited onto the substrate 34 through the metal spray port 22. The deposit of sprayed metal was analyzed metallurgically, and found to be well bonded to the substrate. Other examples of materials that may be deposited include titanium alloys, cobalt alloys, iron alloys, and nonmetallic materials such as oxides of aluminum, zirconium, and chromium.

The approach of the present invention permits the spray coating of substrates with a variety of materials. Laser energy is used to melt the feed material, preferably by creating a plasma in which the melting occurs. Significantly, the spraying of the molten metal occurs in a direction different from that of the laser beam. The laser beam therefore does not impinge upon the substrate, resulting in lower heating of the substrate than might otherwise be the case.

Although the present invention has been described in connection with specific examples and embodiments, it will be understood by those skilled in the arts involved that the present invention is capable of modification without departing from its spirit and scope as represented by the appended claims.

What is claimed is:

1. Apparatus for producing a flow of a molten feed material, comprising:
   a laser heating source having a beam directed into an interaction volume, the beam having an intensity within the interaction volume sufficient to melt the feed material when introduced into the interaction volume;
   means for introducing the feed material into the interaction volume; and
   means for partially confining the molten feed material within the interaction volume and for ejecting the molten feed material from the interaction volume in a direction having a component transverse to the laser beam.

2. The apparatus of claim 1, wherein a plasma is formed within the interaction volume.

3. The apparatus of claim 1, wherein the means for introducing includes a powder feeder wherein powder of the feed material is mixed with a flow of gas and introduced into the interaction volume.

4. The apparatus of claim 3, wherein the gas mixed with the feed material is selected from the group consisting of argon, nitrogen, helium, hydrogen, oxygen, carbon dioxide, and mixtures thereof.

5. The apparatus of claim 1, wherein the means for partially confining includes a source of an axial confinement gas that produces a balanced gas pressure on either side of the interaction volume along the direction of the laser beam, so that molten feed material may not flow parallel to the direction of the laser beam.

6. The apparatus of claim 5, wherein the confinement gas is selected from the group consisting of argon, nitrogen, helium, hydrogen, oxygen, carbon dioxide, and mixtures thereof.

7. The apparatus of claim 1, wherein the molten feed material leaves the interaction volume in a direction perpendicular to the laser beam.

8. The apparatus of claim 1, further including a feed material selected from the group consisting of a titanium alloy, a nickel alloy, a cobalt alloy, an iron alloy, and a nonmetallic material.

9. The apparatus of claim 1, further including a feed material selected from the group consisting of aluminum oxide, zirconium oxide, and chromium oxide.

10. The apparatus of claim 1, further including means for focusing the laser beam into the interaction volume.

11. Apparatus for producing a flow of a molten feed material, comprising:
    containment means for confining a plasma within an interaction volume;
    a laser having a beam directed into the interaction volume along a laser beam direction, the laser having a beam energy density sufficient to form a plasma within the interaction volume and to melt the feed material when introduced into the interaction volume;
    means for introducing the feed material into the interaction volume; and
    means for ejecting melted feed material out of the interaction volume in a direction different from the laser beam direction.

12. The apparatus of claim 11, wherein the molten feed material leaves the interaction volume in a direction perpendicular to the laser beam.

13. The apparatus of claim 11, wherein the means for ejecting includes means for preventing the molten feed material from flowing along the laser beam direction.

14. The apparatus of claim 13, wherein the means for preventing includes means for applying a balanced gas pressure to the interaction volume, the gas pressure being substantially equal on either side of the interaction volume in the direction parallel to the laser beam.

15. Apparatus for producing a molten feed material, comprising:
    a container having a side wall and a laser beam energy dump at one end thereof;
    a laser whose beam is introduced into the container along a beam axis in the direction of the laser beam energy dump;
    a powder introduction port in the side wall of the container, whereby a powder of the feed material may be introduced into the interior of the container at an interaction volume located along the laser beam axis;
    a confinement gas source that produces substantially equal gas pressures within the container at locations equally and oppositely displaced along the laser beam axis from the interaction volume; and a metal spray port in the side wall of the container adjacent the interaction volume.

16. The apparatus of claim 15, wherein the container is cylindrical.

17. A process for forming a flow of molten feed material, comprising the steps of:

directing a laser beam into an interaction volume, the laser beam within the interaction volume having an energy density sufficient to melt feed material contained within the interaction volume;

introducing the feed material into the interaction volume; and removing a stream of melted feed material from the interaction volume in a direction different from the direction of the laser beam.

18. A process for forming a flow of molten feed material, comprising the steps of:

directing a laser beam into a partially confined interaction volume, the laser beam within the interaction volume having an energy density sufficient to melt feed material contained within the interaction volume;

introducing the feed material into the interaction volume; and removing a stream of melted feed material from the interaction volume in a direction different from the direction of the laser beam.

* * * * *